United States Patent [19]

McNeely

[11] Patent Number: 4,916,434

[45] Date of Patent: Apr. 10, 1990

[54] CREDIT CARD CARRIER WITH ALARM

[75] Inventor: Charles D. McNeely, Uniontown, Ohio

[73] Assignee: Donovan International Corporation, Uniontown, Ohio

[21] Appl. No.: 926,711

[22] Filed: Nov. 12, 1986

[51] Int. Cl.[4] .............. C08B 13/14

[52] U.S. Cl. .............. 340/568

[58] Field of Search .............. 340/568, 571, 572, 573

[56] References Cited

U.S. PATENT DOCUMENTS

| | | | |
|---|---|---|---|
| 3,959,789 | 5/1976 | McGahee | 340/568 |
| 4,480,250 | 10/1984 | McNeely | 340/568 |
| 4,652,865 | 3/1987 | Maharshak | 340/568 |
| 4,719,453 | 1/1988 | Beck et al. | 340/568 |

FOREIGN PATENT DOCUMENTS 4656885 2/1986 Australia .

*Primary Examiner*—Joseph A. Orsino
*Assistant Examiner*—Frank M. Scutch, III
*Attorney, Agent, or Firm*—Frease & Bishop

[57] ABSTRACT

A credit card carrier having a plurality of individual card holder pockets formed of celluloid or similar thin plastic material. Each of the pockets is mounted on a flap of the wallet and is adapted to receive a credit card. Each of the pockets is placed one upon another in overlapping relationship and each pocket is provided with an opening for receiving a switch. A switch is formed from a pair of Mylar strips, one of which is the mirror image of the other. The Mylar strips face each other and each facing surface is provided with a thin layer of electrically conducting metallic foil. The switch includes a plurality of arms projecting upwardly and outwardly from the central portion of the strip and all of the arms are electrically connected one to the other. Each of the arms projects into the opening so that each pocket receives one pair of switch arms. The arms are biased toward each other by a spring clip member which engages a portion of each of the arms. A credit card when inserted into a pocket between a pair of arms breaks contact between the arms. A proximity switch is also included in the circuitry which must be closed for an alarm to sound in the event a card is missing from a pocket.

4 Claims, 1 Drawing Sheet

CREDIT CARD CARRIER WITH ALARM

BACKGROUND OF THE INVENTION

1. Field of the Invention

The present invention relates to a device for carrying a plurality of credit cards and more particularly the invention relates to a credit card carrier or wallet which includes an alarm to indicate the absence of a credit card from one or more pockets that receive the credit cards. Most specifically the invention relates to switch means which is a part of the wallet, which switch is normally open when a credit card is received in one of the pockets of the wallet and which is closed when the credit card is absent from the pocket.

2. Description of the Prior Art

The use of credit cards in today's society has become extremely commonplace. A very large number of the consuming public now carry a number of credit cards which they use to make purchases of a wide variety of goods and services in all sorts of retail facilities. It is common for the credit card owner to carry his cards in a wallet which is normlly stored by the card owner in a pocket or purse. When making a purchase, the card owner presents the appropriate card to the retail facility and a record of the sales transaction is made, normally with the card serving as a means of imprinting the card owner's name and account number upon a charge slip and receipt. After the purchase the sales person normally returns the card and receipt to the card owner. Frequently, however, the card owner, for one reason or another, may not return the card used to his wallet, and the card becomes lost. This may result in a substantial amount of inconvenience to the card owner, since he must notify the cardissuing facility of the card's loss to prevent the unauthorized use of the lost card.

Accordingly, it is desirable to provide a wallet or credit card holder which will signal the card owner to alert him to the fact that a card is missing from the card carrier once the carrier has been returned to the owner's pocket or purse.

One such device for accomplishing the above function is shown in my U.S. Pat. No. 4,480,250 which relates to a device which will signal the card owner of the absence of a card from a wallet.

This patent discloses a credit card carrier that includes a pair of flaps that are foldable upon each other in the manner of a cover of a book. Each of the flaps contains a number of clip switches which are adapted for receiving credit cards. These clip switches are arranged in parallel interconnection with one another and in series connection between an alarm battery and a proximity switch.

In the device shown in this patent, the absence of a card from one or more of the clip switches permits the clip switch to close and complete the circuit to sound an alarm. The device also includes a proximity switch so that the circuitry between the battery, alarm and the clip switch is disabled until the flaps are folded one upon each other to close the proximity switch.

The device of the present invention relates to and is an improvement upon the switch shown and disclosed in my patent referred to above. In the device shown in this patent, the cards are held in the foldable flaps in side-by-side relationship to each other. Further, the device shown in this patent includes relatively stiff book cover type members which carry the clip switches and which are hinged to each other. Additionally, the device as disclosed in this patent is either a self-contained device, that is one which is used by itself, or one in which the device is carried as an accessory in a separate wallet.

In certain situations, it may be desirable to provide an arrangement wherein the credit card alarm device can be carried on only one flap of a folding wallet and in which a plurality, for example six, credit cards can be carried on one flap in staggered relationship overlapping one another. Thus, the space occupied by the carrying device would be relatively small, and all of the cards could be carried on one flap of a folding wallet. This type of wallet, commonly called a "pocket secretary" may be carried in an inside pocket of a man's suit, or in a woman's purse.

SUMMARY OF THE INVENTION

Accordingly, it is an object of the present invention to provide a switch device for a credit card alarm circuit in which a plurality of credit cards may be arranged in overlapping relationship with one another and all cards may be carried on one flap of a folding wallet.

Another object of the present invention is to provide a switch for a credit card holder portion of a wallet which can be incorporated into standard "pocket secretary type" wallet design.

A further object of the present invention is to provide a credit card holder which includes a light-sensing diode as a device for activating the alarm circuitry in connection and in combination with the credit card holder switch to indicate the absence of a credit card from its appropriate holder.

A still further object of the present invention is to provide a credit card alarm for a wallet of the "pocket secretary type" which is simple and inexpensive to manufacture, which is extremely lightweight and does not substantially add to the bulk of the "pocket secretary type" wallet.

These and other objects and advantages may be obtained by the improved credit card carrier construction of the present invention, the general nature of which may be stated as including a plurality of individual card holder pockets formed of a celluloid or similar thin plastic material. Each of the pockets is mounted on one flap of a wallet adapted to receive a credit card, and each of the pockets is placed one upon the other in overlapping relationship. Each of the pockets is provided with one opening for receiving a switch. The switch is formed from a pair of mylar strips one of which is the mirror image of the other. The mylar strips face each other and each facing surface is provided with a very thin conducting layer of metallic foil. The mylar switch includes a plurality of arms projecting outwardly and upwardly from the central portion of the strip, and all of the arms are electrically connected one to the other. Each of the arms, which corresponds to the number of pockets, projects into the opening formed in the individual pockets so that each pocket receives one pair of the switch arms. The arms of each pin are each biased toward each other by a spring clip member which engages a portion of each of the arms. A credit card, which is normally formed of plastic and, therefore, nonconducting when inserted into the pocket between one of the pair of arms, urges the spring clip to a position where the conducting surface carried by the mylar switch is out of contact and thus the circuit of the system is broken.

When a credit card is removed thus allowing a pair of arms to contact each other by the biasing of the spring clip, the alarm circuit is complete. If the proximity switch is not disabled as when the card holder returns the wallet to his pocket thereby preventing the light from contacting the light responding diode, the alarm will sound to notify the wallet owner that a card is missing from his wallet.

BRIEF DESCRIPTION OF THE DRAWING

A preferred embodiment of the invention, illustrative of the best mode in which applicant has contemplated applying the principles, is set forth in the following description and shown in the accompanying drawing, and is particularly and distinctly pointed out and set forth in the appended claims.

In the drawing.

Similar numerals refer to similar parts throughout the various figures of the drawing.

DESCRIPTION OF THE PREFERRED EMBODIMENT

Figure 1:
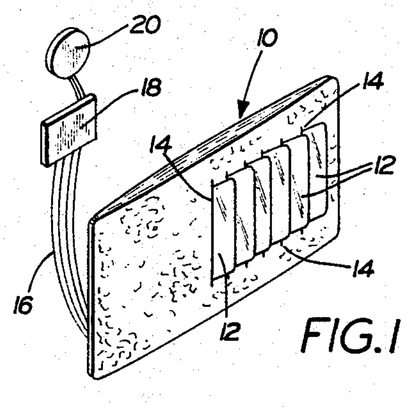
FIG. 1 is a perspective view showing a wallet having a plurality of card-receiving slots, which cards mounted and received therein, together with the alarm and battery circuitry illustrated in diagrammatic fashion.

Referring now to the drawing, FIG. 1 shows a wallet generally indicated at 10 which includes a plurality of credit cards 12 that are inserted into pockets through slots 14. Each of the pockets (not shown in FIG. 1) include switch means to be described below which are connected by wiring 16 to a battery 18 and associated circuitry and an audible alarm 20.

Figure 6:
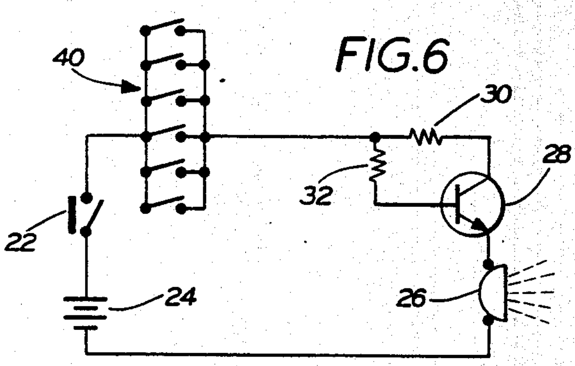
FIG. 6 is a schematic circuit diagram of the alarm circuitry of the present invention.

The circuitry for the operation of the device is shown in FIG. 6 and includes a proximity switch 22, a battery of other power source 24, an audible alarm device 26, and a transistor 28. The transistor 28 has the appropriate gain provided through resistors 30 and 32 in standard fashion. Also included are an array of switches 40 in parallel circuitry with one another. The array of switches 40 is, however, in series with proximity switch 22, power source 24, alarm 26 and transistor gain circuitry 28, 30 and 32. Thus, when proximity switch 22 is closed and one of the array of the switches 40 is closed, the circuitry of the present invention will be complete and alarm 26 will sound.

Proximity switch 22 can be of many different types. However, a preferred form of switch is a light-responsive diode which will permit the flow of current, or complete the circuit when no light falls upon the diode and which will open or interrupt the circuit when light impinges on the diode.

Figure 2:
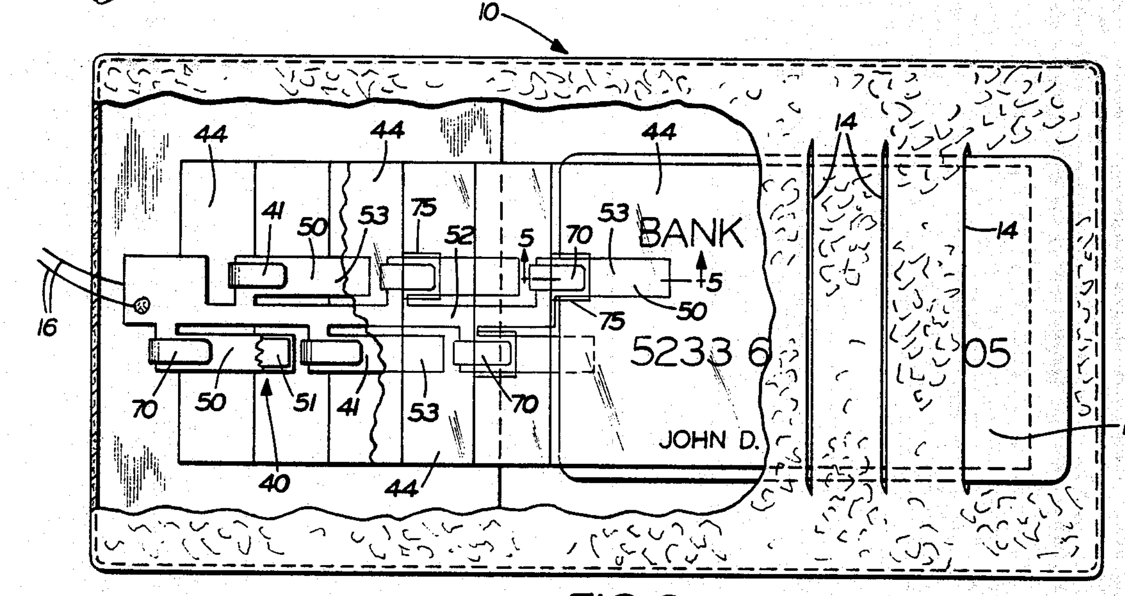
FIG. 2 is a fragmentary plan view illustrating the switch of the present invention as mounted in one leaf of a wallet and having a credit card mounted in one of the pockets.
Figure 3:
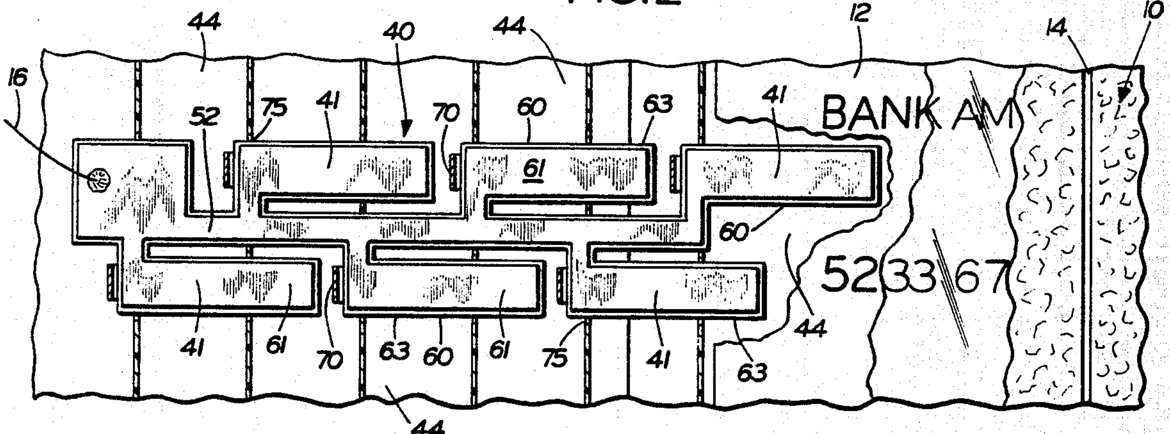
FIG. 3 is an enlarged fragmentary plan view showing one of the mirrow image members of the switch of the present invention.

The array of parallel switches is illustrated specifically in FIGS. 2 through 5 and is mounted on a wallet to provide the function of sounding the alarm to the wallet holder when a card is missing from one of the switches. As illustrated in FIG. 2, the wallet 10 includes pockets for receiving six credit cards 12. Accordingly, there are six individual switches in the array 40 which are operable by individual credit cards 12. Each ofthe switches of array 40 is interconnected with one another and is identified by reference numerals 41 at their contact points.

Wallet 10 is provided with a series of pockets 44 which are adapted to receive credit cards 12. Pockets 44 are formed of two flaps of celluloid or similar thin plastic nonconductive material which is placed in overlapping relationship with each other as shown in FIG. 2.

The device also includes two mylar strip members 50 and 60. Mylar strips 50 and 60 are the mirror image of each other and are, therefore, complementary to each other and their function in the switch mechanism. Mylar strips 50 and 60 are provided with a very thin coating of metallic or other electrically conductive coating 51 and 61 bonded to the strips 50 and 60, respectively, which face one another. Thus, mylar strips 50 and 60 with their respective coatings 51 and 61 each provide a portion of the electrical circuitry for electrical communication of switch array 40.

Figure 4:
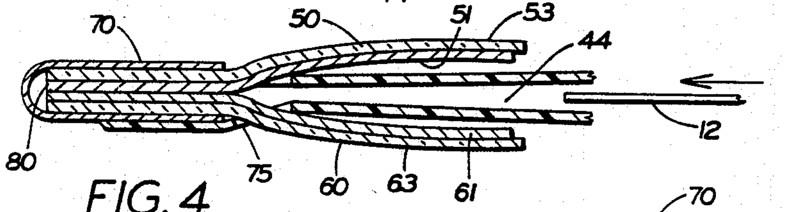
FIG. 4 is a fragmentary cross section showing a credit card being inserted into a pocket prior to the card breaking contact.
Figure 5:
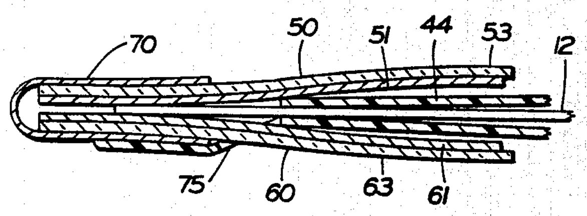
FIG. 5 is an enlarged fragmentary cross section similar to FIG. 4 but with the credit card inserted between the arms of the switch illustrating the manner in which the card breaks switch contact.

Mylar strip 50 includes an elongated strip portion 52 and a series of strip arms 53 projecting from central strip 52. Each of the plurality of arms 53 functions as contact points for each of the individual switches of array 40. Mylar strip 60, being the mirror image of strip 50, includes complementary portions 62 and 63. (Note—portion 62 does not appear on the drawings since it is the mirror image of central strip 52 and is therefore hidden from view in the drawings by central strip 52.); It should be noted that in the drawings, there are six pockets illustrated and thus there are six arms 53–63 with their associated contact points. Each of the pockets 44 is provied with a slot at one end thereof to receive each of the individual arms 53–63 so that each pocket is provided with an individual switch. As shown in FIGS. 4 and 5, the metallic layer 56–61 of each of strips 50 and 60 faces each other to provide switch contact points. A series of spring clips 70 bias mylar strips and conducting layer 51 and 61 toward each other, as shown in FIG. 4.

Each of the arms 53–63 projects within pockets 44 through slots 75. Thus, central strips 52 and 62, while physically facing each other, are separated from electrical contact from one another by a portion of pockets 44.

As best seen in FIGS. 4 and 5, the switch means, which comprises an important aspect of the present invention, includes in a general sense a pair of opposed and complementary strips which have been indicated above as arms 53 and 63. In the broadest sense, each of the strips or arms 53–63 comprises or includes a nonconducting surface and a conducting surface with the conducting surfaces facing one another, and the nonconducting surfaces of each of the two strip portions facing outwardly in opposite directions from one another. Spring clip 70 clamps the two strips together, as seen in FIG. 4, with conducting layer strip or arm 51 contacting the conducting layer 61 of arm 63 as at 80. In the position shown in FIG. 4, the switch formed by the two conducting layers 51 and 61 will be closed since these two conducting layers are in contact with each other. As shown in FIG. 5, when a card 12 is inserted into the pocket 44 and placed in position within the pocket, it will deflect spring clip 70 and separate the two conducting layers 51 and 61 from each other. Thus, the switch formed by arms 53 and 63 will be open and an electrical circuit will not be complete.

As mentioned above, a plurality of arms 53 and 63 which are complementary with each other can be connected and joined together through central strip portion 52. In the present disclosure, six individual switches have been illustrated, but it is to be appreciated that any desired number within the confines of the desired dimensions of the end product can be provided.

As can be appreciated, from FIGS. 1 and 2, the switch mechanism of the present invention is mounted on a "pocket secretary type" wallet and the associated battery, circuitry, proximity switch and alarm, all of which may be of the type disclosed in my patent referred to above, are also mounted in the "pocket secretary type" wallet so that the entire assembly may be carried in the pocket or purse of a user.

The function and use of the device is generally similar to that described in my Patent No. 4,480,250. However, a brief description will permit the appreciation of the manner in which the device functions when used by a card holder. When the user removes the wallet containing the appropriate number of cards in their appropriate slots from his pocket or purse, and removes a card from its respective pocket, the switch that contained the removed card will become closed to the position shown in FIG. 4. However, the alarm will not sound at this point in time since light will be impinging the proximity switch 22 which will be in open position and thereby disable one of the switches of switch array 40. Upon reinsertion of the wallet into a pocket or purse the circuit will be complete and the appropriate power will be supplied to alarm 26 and sound thereby notifying or alerting the card holder that he has failed to return his card to the appropriate place in his wallet.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details of the construction shown or described.

Having now described the features, discoveries and principles of the invention, the manner in which the improved credit card carrier with alarm is constructed, assembled and operated, the characteristics of the new construction, and the advantageous, new and useful results obtained; the new and useful structures, devices, elements, arrangements, parts, and combinations are set forth in the appended claims:

I claim:

1. A card holder including a plurality of receptacles for receiving and holding cards including sensing means associated with each receptacle for determining the presence or absence of a card therein, alarm means operably connected to each sensing means for emitting a signal upon the absence of a card from any of said receptacles and enabling means connected to said alarm means, said sensing means including a first strip having a conducting surface and an opposite nonconducting surface and a second strip having a conducting surface and an opposite nonconducting surface, said first and second strips being the mirror image of and complementary with each other and being arranged with said conducting surfaces facing each other, said receptacles including a slot formed therein, said sensing means including a plurality of arm means projecting from said first and second strips, with at least a portion of said arm means located within said receptacle slots, said receptacle slots and arm means being arranged in staggered relationship with respect to one another, said receptacles overlapping each other, spring clip means engaging the nonconducting surfaces of the first and second strips of each of the sensing means to urge the conducting surfaces into contact with each other, said spring clip means being deflectable by the insertion of a nonconducting card into the receptacles and between the two conducting surfaces whereby a card inserted within the receptacle between the conducting surfaces of the first and second strip arm means breaks contact between said first and second strip arm means and removal of the card permits said arm means conducting surfaces to be in electrical contact with each other to signal the absence of a card in the receptacle, and means for connecting each of the conducting surfaces in electrical interconnection with the alarm means and enabling means.

2. A card carrier as defined in claim 1 in which said enabling means includes switch means responsive to light.

3. A card carrier as defined in claim 2 in which said enabling means is a proximity switch.

4. A card carrier as defined in claim 3 in which said enabling means is a light sensing diode.

* * * * *